United States Patent [19]

Watanabe et al.

[11] Patent Number: 4,780,854
[45] Date of Patent: Oct. 25, 1988

[54] SEMICONDUCTOR INTEGRATED CIRCUIT DEVICE

[75] Inventors: Yohji Watanabe, Kawasaki; Hiroshi Ikeda, Yokohama; Koji Sakui, Tokyo, all of Japan

[73] Assignee: Kabushiki Kaisha Toshiba, Kawasaki, Japan

[21] Appl. No.: 878,691

[22] Filed: Jun. 26, 1986

[30] Foreign Application Priority Data

Jun. 29, 1985 [JP] Japan ................. 60-143737

[51] Int. Cl.$^4$ .............................................. G11C 7/00
[52] U.S. Cl. ..................... 365/226; 307/297
[58] Field of Search ............... 365/226, 227; 307/296 A, 297

[56] References Cited

U.S. PATENT DOCUMENTS 4,401,897  8/1983  Martino, Jr. et al. ............... 307/297
4,482,985  11/1984  Itoh et al. ............... 365/226

FOREIGN PATENT DOCUMENTS 0057563  8/1982  European Pat. Off. .
2308819  11/1973  Fed. Rep. of Germany .
2812378  9/1979  Fed. Rep. of Germany .

OTHER PUBLICATIONS

Modern Electronic Circuits Reference Manual, New York, 1980, pp. 830, 831, 833 and 971.
K. Itoh et al., "An Experimental IMb DRAM with On-Chip Voltage Limiter", ISSCC Dig. Tech. Papers, p. 282, (1984).
T. Mano et al., "Circuits Techniques for a VLSI Memory", IEEE, J. Solid-State Circuits, vol. SC-18, No. 5, p. 463, (1983).
T. Sakurai et al., "VSLI-Oriented Voltage Down Converter with Sub-Main Configuration", Extended abstracts of the 16th Cont. on Solid State Device and Materials, late news, p. 74, (1984).

Primary Examiner—Joseph A. Popek
Attorney, Agent, or Firm—Oblon, Fisher, Spivak, McClelland, & Maier

[57] ABSTRACT

A semiconductor integrated circuit device including a power supply voltage converter and internal circuits. The converter converts an external power supply voltage to an internal power supply voltage of a predetermined value. The internal circuits are driven by the internal power supply voltage. The internal circuits include a clock generator. The converter comprises a reference voltage generator, an output circuit for lowering the external power supply voltage, thereby outputting the internal power supply voltage, and an error signal amplifier for comparing the internal power supply voltage with the reference voltage generated by the reference voltage generator and for controlling the conductance of the output circuit to make the compared voltages equal. The error signal amplifier includes a control signal generator for generating control signals in response to the clock pulses output by the clock generator, and a current control circuit for changing, in accordance with the control signals, the current supplied from an external power supply to the error signal amplifier.

16 Claims, 7 Drawing Sheets

SEMICONDUCTOR INTEGRATED CIRCUIT DEVICE

BACKGROUND OF THE INVENTION

The present invention relates to a semiconductor integrated circuit device having a power supply voltage converter.

Recently, various 1 Mb DRAMs (dynamic random-access memories) which have 2 million or more elements each have been made on trial basis. The narrowest element used in these DRAMs has a width of about 1.2 μm. To fabricate 4 Mb DRAMs and 16 Mb DRAMs, it is necessary to form elements having a width of 1 μm or less. In a 4 Mb or 16 Mb DRAM comprising MOS transistors, each MOS transistor must have a channel length of 1 μm or less. MOS transistors having such a short channel length have an insufficient withstand voltage. Their characteristics will be markedly degraded when a high voltage is applied to the transistors. When the power supply voltage of 5 V, which is generally used, is applied to the MOS transistors, the 4 Mb and 16 Mb DRAMs will function unstably and unreliably. To work stably, they must have a voltage converter for converting the output voltage (5 V) of the generally used external power supply to a lower voltage and applying the lower voltage to the MOS transistors.

Figure 1:
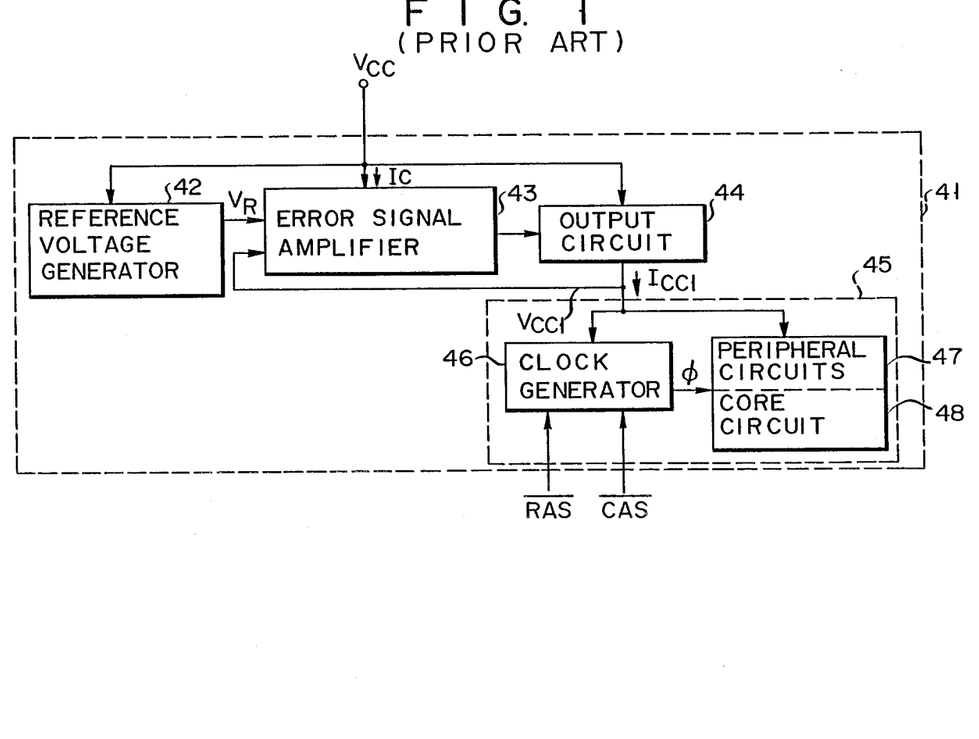
FIG. 1 is a block diagram of a conventional DRAM chip containing a power supply voltage converter designed for experimental purpose.

FIG. 1 is a block diagram of a conventional DRAM containing a power supply voltage converter which has been designed or fabricated for experimental purposes. The voltage converter is formed in a chip 41 and comprises reference voltage generator 42, error signal amplifier 43 and output circuit 44. Error signal amplifier 43 compares reference voltage VR, i.e., the output of generator 42, with internal power supply voltage Vccl, i.e., the output of circuit 44. Amplifier 43 also controls the conductance of output circuit 44 to make Vccl equal to VR. The output voltage (Vccl) of circuit 44 is applied to DRAM circuit 45.

DRAM circuit 45 comprises clock generator 46, peripheral circuits 47 and core circuit 48. Internal power supply voltage Vccl is applied to clock generator 46, peripheral circuits 47 and core circuit 48. $\overline{RAS}$ (row address strobe) and $\overline{CAS}$ (column address strobe) are supplied to clock generator 46 from external devices (not shown). Clock generator 46 generates a reference clock φ, which is supplied to peripheral circuits 47 and core circuit 48. The greatest DC current which the voltage converter can provide can easily be changed or adjusted by changing the design of output circuit 44.

Figure 2A:
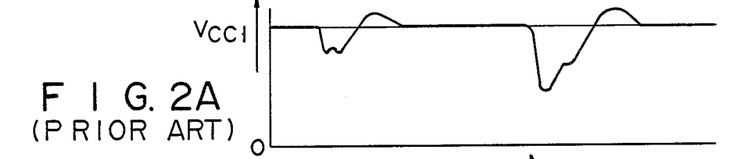
FIG. 2A shows how the internal power supply voltage, Vccl, changes in the DRAM of FIG. 1 as current Iccl consumed in the internal circuits varies.
Figure 2B:
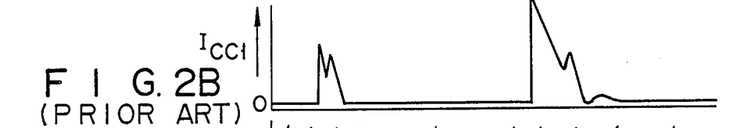
FIG. 2B shows how current Iccl varies with time.
Figure 2C:
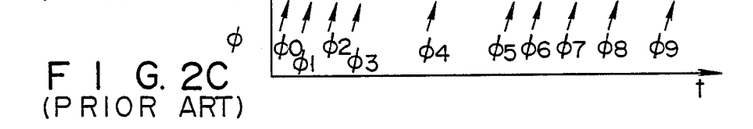
FIG. 2C illustrates the timings at which clock pulses are generated.

Internal power supply voltage Vccl (i.e., the output of the conventional voltage converter) changes when a peak current abruptly flows through DRAM circuit 45, as is illustrated in FIGS. 2A, 2B and 2C. More precisely, when current Iccl (FIG. 2B) supplied from output circuit 44 to DRAM circuit 45 rapidly increases, voltage Vccl (FIG. 2A) rapidly falls. This adversely influences the operation of DRAM circuit 45 very much.

Figure 3:
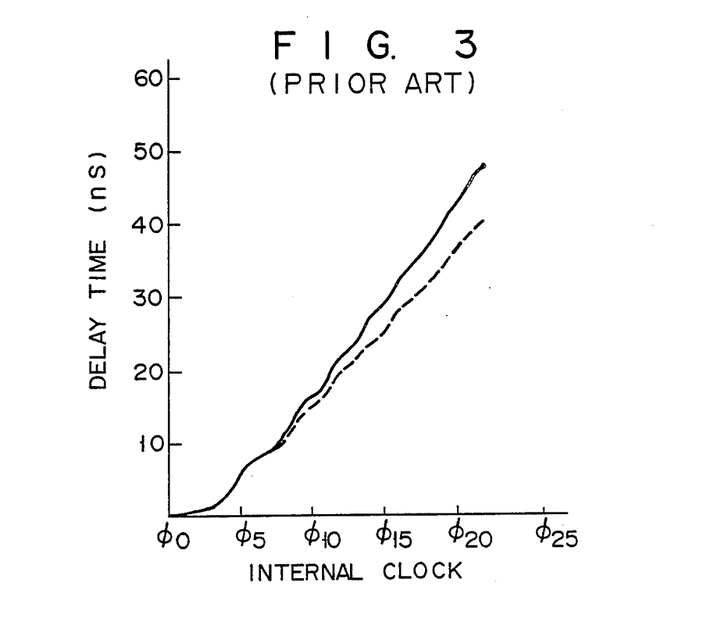
FIG. 3 shows how clock pulses should be delayed in the DRAM of FIG. 1 as the internal power supply voltage changes, if the DRAM had not been provided with a voltage converter.

Were the voltage converter not provided, the clock pulses would be delayed as shown in FIG. 3 when the voltage applied to clock circuit 46 falls. The data of FIG. 3 has been obtained by computer simulation. The solid line represents how much clock pulses are delayed when the impedance of the power supply lines is relatively high, and the broken line shows how the pulses are delayed when the impedance is negligibly low. The delay of clock pulses, if taking place in the DRAM, will not only lengthen the access time of the DRAM but also will narrow the operation margin of the DRAM.

These problems are more prominent in the DRAM (FIG. 1), as can be clearly understood from FIG. 3, though FIG. 3 shows the results of the computer simulation conducted on the assumption that no power supply voltage converters are used. Due to the response delay of the power supply voltage converter, voltage Vccl considerably falls and cannot regain the initial level in a short time. Consequently, clock pulse generator 46 outputs pulses much delayed.

The response characteristics of the power supply voltage converter can be improved by supplying a great current to error signal amplifier 43 to give amplifier 43 a great drive ability. The general technical trend is, however, to reduce the power consumption of integrated circuits to a minimum. Hence, it is undesirable that a large current is supplied to amplifier 43 formed on chip 41 along with DRAM circuit 45.

SUMMARY OF THE INVENTION

The object of the present invention is to provide a semiconductor integrated circuit device having a power supply voltage converter which consumes little power and outputs a stable internal power supply voltage.

A semiconductor integrated circuit device of the invention has a power supply voltage converter. The voltage converter contains a circuit for stabilizing an internal power supply voltage.

According to one aspect of the invention, use is made of a power supply voltage converter comprising a reference voltage generator, an error signal amplifier and an output circuit. The converter further comprises a circuit for changing the amount of the current flowing into the error signal amplifier to stabilize an internal power supply voltage.

According to another aspect of the invention, use is made of a power supply voltage converter comprising an output circuit for lowering an external power supply voltage and a circuit for changing the conductance of the output circuit under the control of clock pulses to stabilize the voltage which is provided by the output circuit and is used as an internal power supply voltage.

Either power supply voltage converter described above is controlled by clock pulses to stablize an internal power supply voltage in accordance with the operation characteristic of internal circuits responsive to the clock pulses. It can, therefore, provide a stable internal power supply voltage even if the input current greatly changes while the internal circuits are operating. Therefore, the converter serves to improve the operation speed (i.e., access time) and operation margin of the semiconductor integrated circuit device.

The response characteristic of the power supply voltage converter is determined by the slew rate SR of the error signal amplifier. Rate SR is generally given:

$$SR = k \cdot Ic/C$$

where k is the constant inherent in the amplifier, Ic is the input current of the amplifier, and C is the input capacitance of the output circuit.

As is clearly understood from the above equation, the response characteristic of the converter can be improved by increasing current Ic. If current Ic is increased, however, the power consumption of the circuit device will increase.

In the case of a DRAM, the peak current flows for a limited period during each operation cyle, as is shown in FIG. 2B. When the DRAM is operated as a load to the voltage converter, it suffices to increase current Ic for only this limited period in order to raise the slew rate SR.

Therefore, in one of the voltage converters of this invention, current Ic is changed over in synchronism with the operation of the internal circuits which are loads to the voltage converter. The voltage converter can thereby reduce the changes of the internal power supply voltage despite the abrupt changes in the currents flowing through the internal circuits. The voltage converter can, therefore, reduce the power consumption of the semiconductor integrated circuit device.

Moreover, in the other voltage converter provided with an output circuit for lowering an external power supply voltage to provide a low internal power supply voltage, the conductance of this output circuit is controlled by clock pulses, thereby reducing the changes of the internal power supply voltage.

BRIEF DESCRIPTION OF THE DRAWINGS

FIGS. 7A, 7B and 7C show the waveforms of signals recorded by experiments conducted on the first embodiment, and explaining the advantage of the invention, where

FIGS. 12A to 12D explain the operation of the voltage converter shown in FIG. 10, where

DETAILED DESCRIPTION OF THE PREFERRED EMBODIMENTS

Embodiments of the invention will be described with reference to the accompanying drawings.

Figure 4:
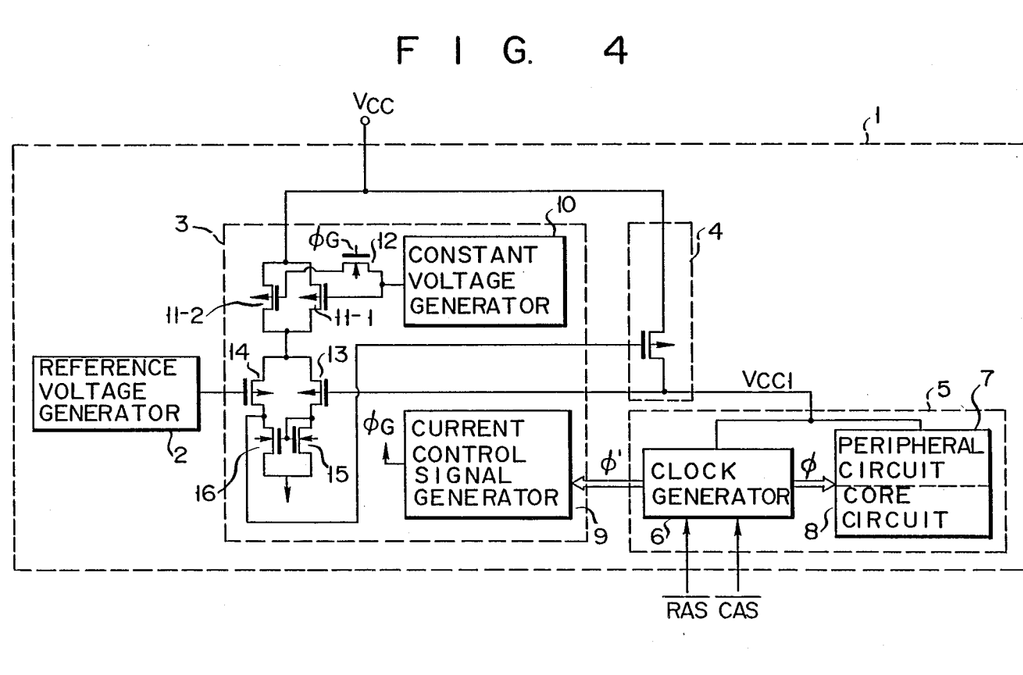
FIG. 4 a block diagram of a DRAM chip containing a power supply voltage converter, according to a first embodiment of the invention.

FIG. 4 schematically shows a DRAM according to the first embodiment of the invention. A voltage converter is formed in silicon chip 1. The converter comprises reference voltage generator 2, error signal amplifier 3 and output circuit 4. DRAM circuit 5, i.e., the main component of the DRAM, is also formed in chip 1. DRAM circuit 5 comprises reference clock generator 6, peripheral circuits 7 and core circuit 8. Error signal amplifier 3 comprises current control signal generator 9, a CMOS amplifier, constant voltage generator 10, p-channel MOS transistors 11-1 and 11-2, and n-channel MOS transistor 12. The CMOS amplifier is a current mirror differential amplifier made of p-channel MOS transistors 13 and 14 and n-channel MOS transistors 15 and 16. Transistor 12 is turned on and off by control signal $\phi G$ supplied from control pulse generator 9. MOS transistors 11-1 and 11-2 are connected in parallel for changing the current fed from an external voltage source (Vcc) and supplying the changed current to the CMOS amplifier. MOS transistor 11-1 is continuously driven by constant voltage generator 10. In contrast, MOS transistor 11-2 is intermittently driven by circuit 10 as MOS transistor 12 is turned on and off by control signal $\phi G$. Clock generator 6 generates clocks $\phi$ for driving peripheral circuits 7 and core circuit 8. If necessary, generator 6 generates clocks synchronous with clocks $\phi$. Control pulse generator 9 generates a pulse $\phi G$ and response to clocks $\phi'$ which are some of the clocks generated by clock generator 6.

Figure 5:
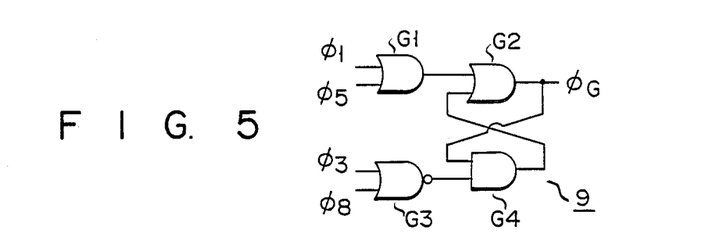
FIG. 5 is a circuit diagram of the current control pulse generator used in the voltage converter shown in FIG. 4.
Figure 6:
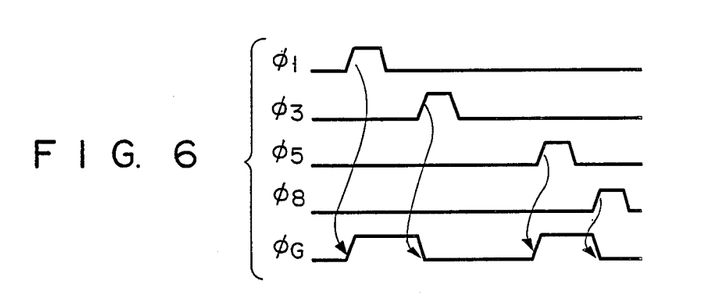
FIG. 6 is a timing chart illustrating the operation of the control pulse generator shown in FIG. 5.

Let us assume that the clock ($\phi$) generated in DRAM circuit 5 and the current (Iccl) flowing in circuit 5 have the timing relationship shown in FIGS. 2B and 2C. It suffices to increase the current supplied to error signal amplifier 3 only for the period between the leading edges of clocks $\phi 1$ and $\phi 3$ and for the period between the leading edges of clocks $\phi 5$ and $\phi 8$. To increase current Iccl in this way, to control pulse generator 9 has gates OR gates G1 and G2, NOR gate G3 and AND gate G4 arranged as shown in FIG. 5. Clocks $\phi 1$–$\phi 8$ rise and fall as shown in FIG. 6. When clock $\phi 1$ rises to high level, high-level control pulse $\phi G$ is output via OR gages G1 and G2. Even after clock $\phi 1$ has fallen to low level, clock $\phi G$ is high as long as the output of AND gate G4 stays high. When clock $\phi 3$ rises to high level, the output of NOR gage G3 falls to low level, and the output of AND gate G4 also falls to low level, lowering control signal $\phi G$ to low level. When clock $\phi 5$ rises, pulse $\phi G$ falls. When clock $\phi 8$ rises, signal $\phi G$ falls. In short, control pulse $\phi G$ changes as shown in FIG. 6.

In error signal amplifier 3, a constant current continuously flows through MOS transistor 11-1. A current flows through MOS transistor 11-2 when control pulse $\phi G$ stays high. Hence, when a peak current flows while DRAM circuit 5 is operating, the current flowing in amplifier 3 increases, improving the response characteristics of amplifier 3 and reducing the changes of internal power supply voltage Vccl. Since the period during which a large current flows in amplifier 3 is a small part of the operation cycle of DRAM circuit 5, the power consumption of the DRAM scarcely increases.

Figure 7A:
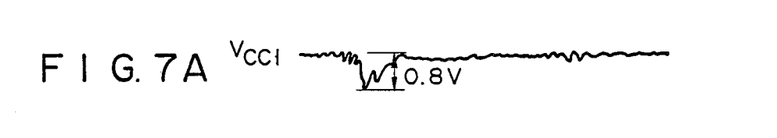
FIG. 7A shows how the internal power supply voltage Vccl changes.
Figure 7B:
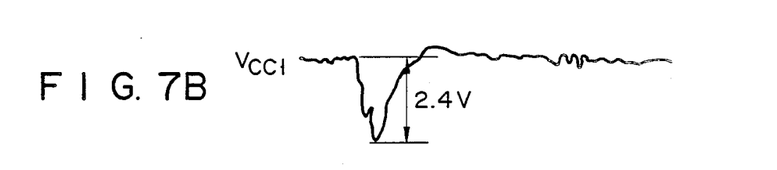
FIG. 7B shows how voltage Vccl would change if the voltage converter were not used.
Figure 7C:
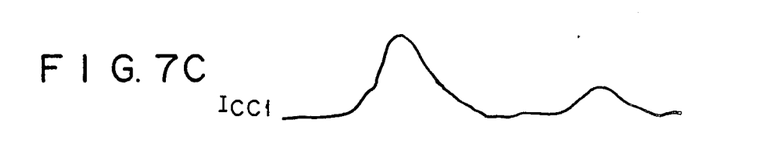
FIG. 7C shows how the internal current Iccl changes.

FIG. 7A explains how voltage Vccl supplied to DRAM circuit 5 changes. FIG. 7C shows how current Iccl varies. Without the voltage converter, voltage Vccl would change as illustrated in FIG. 7B. (The waveforms shown in FIGS. 7A, 7B and 7C are based on experimental data.) As may be understood from FIGS. 7A and 7B, the voltage converter can minimize the changes of internal power supply voltage Vccl.

In the first embodiment, MOS transistor 11-1 which is continuously on and MOS transistors 11-2 which is turned on and off are connected in parallel to change the current flowing in error signal amplifier 3. Other MOS transistor connected in parallel can be provided, and other control signals than $\phi G$ can be used, to change the current flowing in circuit 3 more minutely.

Figure 8:
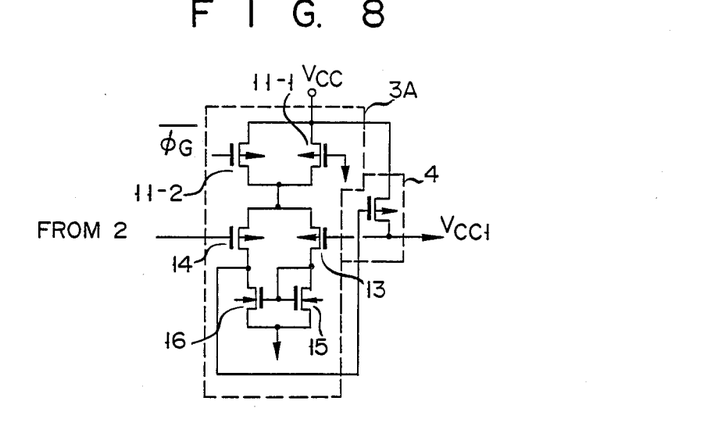
FIG. 8 is a circuit diagram of the error signal amplifier and the output circuit used in a second embodiment of the invention.

FIG. 8 shows another error signal amplifier 3A used in the second embodiment of the invention. Amplifier 3A differs from error signal amplifier 3 shown in FIG. 4 in that no components equivalent to constant voltage generator 10 and n-channel MOS transistor 12 are provided. In amplifier 3A, p-channel MOS transistor 11-1 has its gate grounded and is continuously on, and p-channel MOS transistor 11-2 is controlled by control pulse $\phi G$ obtained by inverting pulse $\overline{\phi G}$ output by control pulse generator 9.

Figure 9:
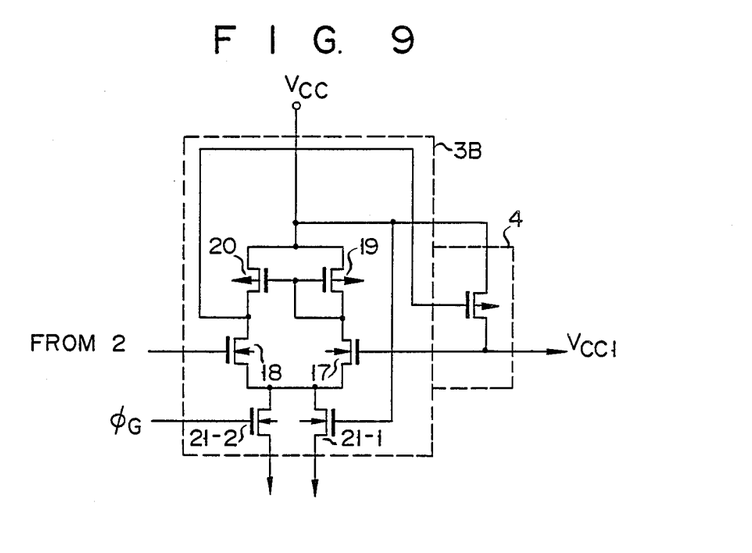
FIG. 9 is a circuit diagram of the error signal amplifier and the output circuit used in a third embodiment of the invention.

FIG. 9 shows still another error signal amplifier 3B used in the third embodiment of this invention. Amplifier 3B comprises a current mirror amplifier circuit having n-channel MOS transistors 17 and 18 and p-channel MOS transistors 19 and 20. It further comprises n-channel MOS transistors 21-1 and 21-2. MOS transistors 21-1 and 21-2 control the current supplied to the current mirror amplifier circuit. Transistor 21-1 has its gate connected to external power supply voltage source (Vcc) and is continuously on. Transistor 21-2 is controlled by control signal $\phi G$.

Figure 10:
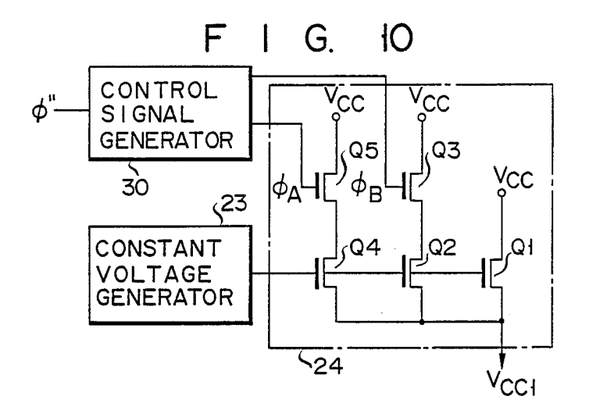
FIG. 10 shows the voltage converter for use in a fourth embodiment of the invention.
Figure 11:
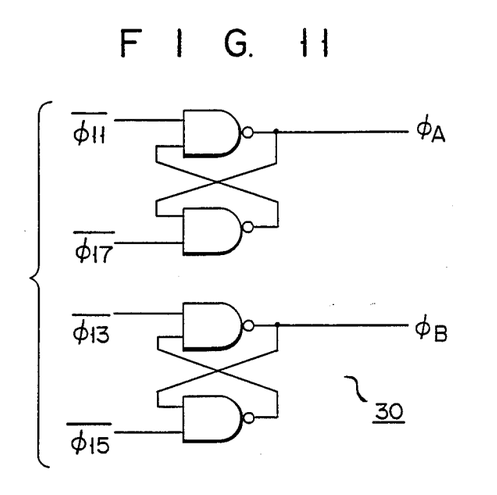
FIG. 11 is a circuit diagram of a control pulse generator used in the voltage converter of FIG. 10.

FIG. 10 shows another internal power supply voltage converter used in the fourth embodiment. This converter comprises constant voltage generator 23, output circuit 24, and control pulse generator 30. Output circuit 24 is controlled by clock pulses. The output of constant voltage generator 23 is input to output circuit 24. Circuit 24 comprises MOS transistor Q1 for lowering external power supply voltage Vcc to provide internal power supply voltage Vccl. It further comprises MOS transistors Q2-Q5. The output of constant voltage generator 23 is applied to the gates of MOS transistors Q1, Q2 and Q4. The drains of MOS transistors Q2 and Q4 are coupled to the sources of MOS transistors Q3 and Q5 which in turn are connected to external power supply voltage source (Vcc). The gates of MOS transistors Q3 and Q5 are controlled by control pulses $\phi A$ and $\phi B$. Transistors Q2-Q5 form a circuit for change in the conductance of output circuit 24. Control pulses $\phi A$ and $\phi B$ are generated by control pulse generator 30 (FIG. 11).

Figure 12A:
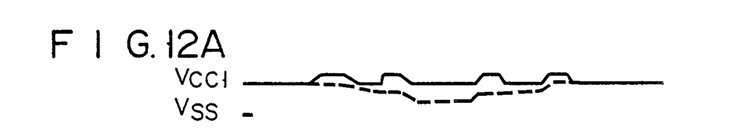
FIG. 12A shows how internal power supply voltage Vccl changes.
Figure 12B:
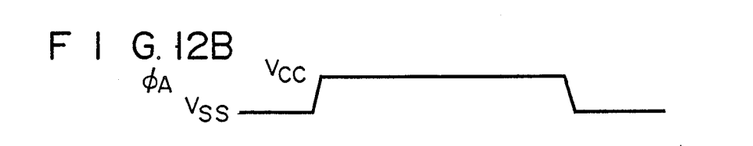
FIGS. 12B and 12C show the waveforms of control pulses $\phi A$ and $\phi B$.
Figure 12C:
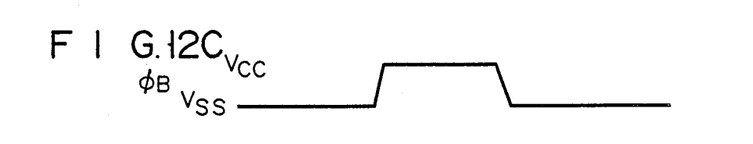
Figure 12D:
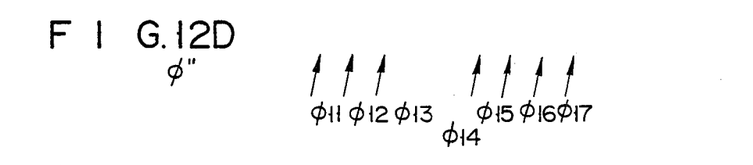
FIG. 12D shows the timings at which clock pulses are generated.

FIGS. 12A-12D illustrate how internal power supply voltage Vccl is stabilized in the fourth embodiment of the invention. Pulse generator 30 (FIG. 11) generates control pulses $\phi A$ and $\phi B$ from clocks $\phi''$ shown in FIG. 12D. As shown in FIG. 12B, pulse $\phi A$ rises in response to clock $\phi 11$ and falls in response to clock $\phi 17$. As shown in FIG. 12C, pulse $\phi B$ rises in response to clock $\phi 13$ and falls in response to clock $\phi 15$. The levels of both pulses $\phi A$ and $\phi B$ are set to vary as internal power supply voltage Vccl is changed by the noise induced in the power supply lines. Pulses $\phi A$ and $\phi B$ turn on MOS transistors Q5 and Q3 of output circuit 24, respectively. The conductance of circuit 24 is determined solely by the channel width of MOS transistor Q1 as long as neither control pulse is supplied to circuit 24. When control pulse $\phi A$ is supplied, the conductance increases by the value corresponding to the channel width of MOS transistor Q4. When control pulse $\phi B$ is supplied in addition to pulse $\phi A$, the conductance further increases by the value corresponding to the channel width of MOS transistor Q2. If output circuit 24 consisted of only MOS transistor Q1, voltage Vccl should fall and then rise as represented by the broken line in FIG. 12A. Since circuit 24 has MOS transistors Q2-Q5 in addition to MOS transistor Q1, voltage Vccl does not fall, as is indicated by the solid line in FIG. 12A.

The fourth embodiment can also reduce the changes of internal power supply voltage Vccl.

Figure 13:
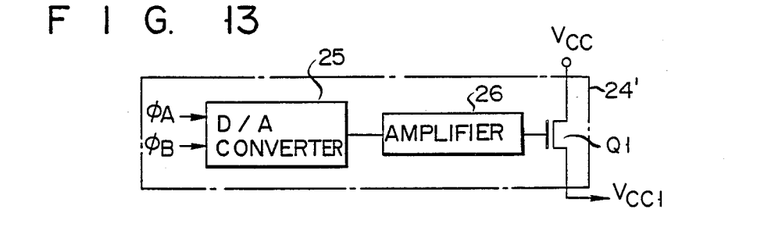
FIG. 13 shows part of the voltage converter for use in a fifth embodiment of the invention.

FIG. 13 shows a further internal power supply voltage converter used in the fifth embodiment. This converter is a modification of the converter shown in FIG. 10. It comprises output circuit 24' and control pulse generator 30 (FIG. 11). Output circuit 24' comprises D/A converter 25, amplifier 26 and MOS transistor Q1. The gate voltage of MOS transistor Q1 is controlled by control pulses $\phi A$ and $\phi B$ generated by generator 30. More specifically, D/A converter 25 generates voltage (analog data) from pulses $\phi A$ and $\phi B$. Amplifier 26 amplifies these voltages. The amplified voltages are applied to the gate of MOS transistor Q1. The fifth embodiment can achieve the same advantage as the fourth embodiment.

In the fourth and fifth embodiments, two control pulses are used to control the conductance of the output circuit (24 or 24') to reduce the changes of internal power supply voltage Vccl which should otherwise fall in two steps. Instead of two control pulses, one control pulse or three or more control pulses can be input to the output circuit for the same purpose.

The present invention is not limited to the embodiments described above. Various changes or modifications can be made.

For example, the clock generator provided within the DRAM circuit can be driven by external power supply voltage Vcc, instead of internal power supply voltage Vccl. Further, the invention can be applied to various integrated circuits other than DRAMs. Moreover, it can be applied to an IC device comprising a plurality of integrated circuits which consume power at different times. If this is the case, a plurality of internal power supply voltage converters can be provided, each for one integrated circuit.

What is claimed is:

1. A semiconductor integrated circuit device comprising:
    a power supply voltage converting circuit for converting an external power supply voltage to an internal power supply voltage of a predetermined value;
    internal circuits including a clock generating circuit, driven by the internal power supply voltage output by said power supply voltage converting circuit, the power consumption of said internal circuits varying cyclically in relation to clock pulses generated by said clock generating circuit; and
    said voltage converting circuit having a control signal generating means for generating, based on the clock pulses, control signals corresponding to the power consumption of said internal circuits, and voltage stabilizing means controlled by the control signal for stabilizing the internal power supply voltage.

2. A semiconductor integrated circuit device comprising:
a power supply voltage converting circuit for converting an external power supply voltage to an internal power supply voltage of a predetermined value;
internal circuits including a clock generating circuit, driven by the internal power supply voltage output by said power supply voltage converting circuit;
said voltage converting circuit having a reference voltage generating circuit for generating a reference voltage, an output circuit for lowering the external power supply voltage, thereby outputting the internal power supply voltage, and an error signal amplifying circuit for comparing the internal power supply voltage with the reference voltage and controlling a conductance of said output circuit to make the internal power supply voltage equal to the reference voltage; and
said error signal amplifying circuit including a control signal generating means for generating control signals in response to clock pulses generated by said clock generating circuit, and voltage stabilizing means controlled by the control signals for stabilizing the internal power supply voltage.

3. The device according to claim 2, wherein said control signal generating means includes a control signal generating circuit for generating control signals in response to the clock pulses, and said voltage stabilizing means includes a current control circuit for varying the amount of the current flowing from an external power supply into the error signal amplifying circuit in accordance with the control signals.

4. The device according to claim 3, wherein said control signal generating circuit includes a circuit for generating a control signal for a predetermined period during each clock cycle.

5. The device according to claim 3, wherein said current control circuit includes at least one current control element for supplying the current from the external power supply to said error signal amplifying circuit and for controlling the current in accordance with the control signal.

6. The device according to claim 3, wherein said current control circuit includes a plurality of current supply paths provided parallel to each other for supplying the current from the external power supply to said error signal amplifying circuit, and a plurality of current control elements, each provided in one current supply path, for controlling the current in accordance with the control signal, and said control signal generating circuit includes a circuit for generating control signals for selectively driving said current control elements.

7. The device according to claim 3, wherein said control signal generating circuit is a logic circuit for performing logic operations on the clock pulses to provide logic signals to be used as said control signals.

8. A semiconductor integrated circuit device comprising:
a power supply voltage converting circuit for converting an external power supply voltage to an internal power supply voltage of a predetermined value;
internal circuits including a clock generating circuit, driven by the internal power supply voltage output by said power supply voltage converting circuit; and
said voltage converting circuit having an output circuit for including a control signal generating means for generating control signals in response to clock pulses generated by said clock generating circuit, and voltage stabilizing means controlled by the control signals for stabilizing the internal power supply voltage.

9. The device according to claim 8, wherein said control signal generating means includes a control signal generating circuit for generating the control signals, and said voltage stabilizing means includes a control circuit for controlling the conductance of said output circuit in accordance with the control signals.

10. The device according to claim 9, wherein said control signal generating circuit includes a circuit for generating a control signal for a predetermined period during each clock cycle.

11. The device according to claim 10, wherein said control signal generating circuit is a logic circuit for performing logic operations on the clock pulses to provide logic signals to be used as said control signals.

12. The device according to claim 10, wherein said control signal generating circuit includes a circuit for generating an analog control signal changing in response to the clock pulses.

13. The device according to claim 9, wherein said control circuit has a plurality of conductance control elements, and said control signal generating circuit has a circuit for generating control signals for selectively driving the conductance control elements.

14. The device according to claim 9, wherein said control signal generating circuit is a logic circuit for performing logic operations on the clock pulses to provide logic signals which are used as said control signals.

15. The device according to claim 2, wherein said internal circuits include a MOS dynamic RAM circuit.

16. The device according to claim 8, wherein said internal circuits include a MOS dynamic RAM circuit.

* * * * *